(12) United States Patent
Toizumi et al.

(10) Patent No.: US 12,034,900 B2
(45) Date of Patent: *Jul. 9, 2024

(54) IMAGE PROCESSING SYSTEM, IMAGE PROCESSING METHOD, AND NON-TRANSITORY COMPUTER READABLE MEDIUM FOR GENERATING A COLORIZED IMAGE

(71) Applicant: NEC Corporation, Tokyo (JP)

(72) Inventors: Takahiro Toizumi, Tokyo (JP); Masato Tsukada, Tokyo (JP); Chisato Funayama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1 day.

This patent is subject to a terminal disclaimer.

(21) Appl. No.: 17/795,678

(22) PCT Filed: Feb. 13, 2020

(86) PCT No.: PCT/JP2020/005562
§ 371 (c)(1),
(2) Date: Jul. 27, 2022

(87) PCT Pub. No.: WO2021/161453
PCT Pub. Date: Aug. 19, 2021

(65) Prior Publication Data
US 2023/0059407 A1 Feb. 23, 2023

(51) Int. Cl.
*G06T 7/90* (2017.01)
*G06N 20/00* (2019.01)
(Continued)

(52) U.S. Cl.
CPC ............ *H04N 1/465* (2013.01); *G06N 20/00* (2019.01); *G06T 7/90* (2017.01); *G06V 10/761* (2022.01);
(Continued)

(58) Field of Classification Search
None
See application file for complete search history.

(56) References Cited

U.S. PATENT DOCUMENTS 6,493,029 B1 12/2002 Denyer et al.
11,158,286 B2 * 10/2021 Yaacob ................... G09G 5/06
(Continued)

FOREIGN PATENT DOCUMENTS

JP    H04-248684 A    9/1992
JP    2015-125498 A   7/2015
(Continued)

OTHER PUBLICATIONS

JP Office Action for JP Application No. 2021-577792, dated Mar. 22, 2023 with English Translation.
(Continued)

*Primary Examiner* — Joni Hsu
(74) *Attorney, Agent, or Firm* — Sughrue Mion, PLLC

(57) ABSTRACT

An image processing system according to the present disclosure includes: an image acquisition unit configured to acquire a monochrome image of a subject including a target part; a hint acquisition unit configured to acquire a category of the target part and a first color hint indicating a color of the target part; a hint conversion unit configured to convert the first color hint into a second color hint indicating the color of the target part based on the acquired category; and a colorization generation unit configured to generate a colorized image corresponding to the monochrome image from the monochrome image and the second color hint of the target part by using a prediction model trained by machine learning.

8 Claims, 18 Drawing Sheets

(51) Int. Cl.
*G06V 10/74* (2022.01)
*G09G 5/06* (2006.01)
*H04N 1/46* (2006.01)

(52) U.S. Cl.
CPC .............. *G06T 2207/10024* (2013.01); *G06T 2207/20081* (2013.01); *G09G 5/06* (2013.01)

(56) References Cited

U.S. PATENT DOCUMENTS

| | | | | |
|---|---|---|---|---|
| 2006/0245645 | A1* | 11/2006 | Yatziv | G06T 5/005 382/167 |
| 2008/0037828 | A1* | 2/2008 | Fujita | G06V 20/588 382/104 |
| 2013/0070319 | A1* | 3/2013 | Yamada | H04N 1/6086 358/518 |
| 2014/0132429 | A1 | 5/2014 | Scoville | |
| 2017/0070645 | A1 | 3/2017 | Ishitoya | |
| 2017/0323460 | A1* | 11/2017 | Carney | G01J 3/524 |
| 2019/0297226 | A1* | 9/2019 | Ohkubo | H04N 1/60 |
| 2020/0167972 | A1* | 5/2020 | Birnhack | G06N 3/045 |

FOREIGN PATENT DOCUMENTS

| | | |
|---|---|---|
| JP | 2019-117558 A | 7/2019 |
| JP | 2019-128889 A | 8/2019 |
| JP | 2019-140538 A | 8/2019 |
| JP | 2019-145030 A | 8/2019 |
| JP | 2019-145038 A | 8/2019 |
| JP | 2019-153917 A | 9/2019 |

OTHER PUBLICATIONS

International Search Report for PCT Application No. PCT/JP2020/005562, dated Mar. 31, 2020.
Richard Zhang, Jun-Yan Zhu et al, "Real-Time User-Guided Image Colorization with Learned Deep Priors", ACM Transactions on Graphics, May 8, 2017.
International Search Report of PCT Application No. PCT/JP2020/00556 dated Apr. 7, 2020.
U.S. Office Action for U.S. Appl. No. 17/795,687, dated Nov. 17, 2023.
US Office Action for U.S. Appl. No. 17/795,687, mailed on Apr. 15, 2024.

* cited by examiner

| CATEGORY | SECOND COLOR HINT | | |
|---|---|---|---|
| | L | a | b |
| SKIN | L21 | a21 | b21 |
| | ... | ... | ... |
| | ... | ... | ... |
| SKY | L22 | a22 | b22 |
| | ... | ... | ... |
| ... | ... | ... | ... |

Fig. 7A

| CATEGORY | FIRST COLOR HINT | SECOND COLOR HINT | | |
|---|---|---|---|---|
| | | L | a | b |
| SKIN | L11~L12, a11~a12, b11~b12 | L21 | a21 | b21 |
| | L12~L13, a12~a13, b12~b13 | L22 | a22 | b22 |
| | ... | ... | ... | ... |
| SKY | ... | L23 | a23 | b23 |
| | ... | L24 | a24 | b24 |
| | ... | ... | ... | ... |
| ... | ... | ... | ... | ... |

Fig. 8A

| CATEGORY | CONVERSION PARAMETER | | |
|---|---|---|---|
| SKIN | P11 | P12 | ... |
| SKY | ... | ... | ... |
| ... | ... | ... | ... |

Fig. 9A

IMAGE PROCESSING SYSTEM, IMAGE PROCESSING METHOD, AND NON-TRANSITORY COMPUTER READABLE MEDIUM FOR GENERATING A COLORIZED IMAGE

This application is a National Stage Entry of PCT/JP2020/005562 filed on Feb. 13, 2020, the contents of all of which are incorporated herein by reference, in their entirety.

TECHNICAL FIELD

The present disclosure relates to an image processing system, an image processing method, and a non-transitory computer readable medium that colorize a monochrome image.

BACKGROUND ART

An image processing system which converts a monochrome image into a colorized image using a trained prediction model based on colors (color hints) designated by a user using a general-purpose color palette has been known (see Non Patent Literature 1). Further, Patent Literature 1 discloses a method for associating categories for a subject included in a monochrome image with preferred colors of the subject and storing them in a color database in advance and then determining a color to be applied in response to an input of a category by a user.

CITATION LIST

Patent Literature

Patent Literature 1: Japanese Unexamined Patent Application Publication No. H4-248684

Non Patent Literature

Non Patent Literature 1: Richard Zhang, Jun-Yan Zhu, "Real-Time User-Guided Image Colorization with Learned Deep Priors.", ACM Transactions on Graphics, submitted on May 8, 2017

SUMMARY OF INVENTION

Technical Problem

However, in the image processing system described above, there is a problem that, in order for a user to select a preferred color hint suitable for the subject from the general-purpose color palette, the user needs to designate and confirm the color hint a number of times, and thus it takes time and effort to make this selection.

Further, in the method disclosed in Patent Literature 1, since only predetermined colors are determined as colors to be applied to the categories for the subject, a color cannot be adjusted in accordance with the color designated by the user. Therefore, even when the monochrome image is colorized using the aforementioned colors as color hints, there is a problem that the reproduction accuracy of a color is not sufficient.

The present disclosure has been made in view of the above-described problem and an object thereof is to provide an image processing system, an image processing method, and a non-transitory computer readable medium that more easily improve the reproduction accuracy of a color in colorization of a monochrome image.

Solution to Problem

An image processing system according to an example aspect of the present disclosure includes an image acquisition unit configured to acquire a monochrome image including a target part. The image processing system further includes a hint acquisition unit configured to acquire a category of the target part and a first color hint indicating a color of the target part. The image processing system further includes a hint conversion unit configured to convert the first color hint into a second color hint indicating the color of the target part based on the acquired category. The image processing system further includes a colorization generation unit configured to generate a colorized image corresponding to the monochrome image from the monochrome image and the second color hint of the target part by using a prediction model trained by machine learning.

An image processing method according to another example aspect of the present disclosure includes acquiring a monochrome image including a target part. The image processing method further includes acquiring a category of the target part and a first color hint indicating a color of the target part. The image processing method further includes converting the first color hint into a second color hint indicating the color of the target part based on the acquired category. The image processing method further includes generating a colorized image corresponding to the monochrome image from the monochrome image and the second color hint of the target part by using a prediction model trained by machine learning.

A non-transitory computer readable medium according to another example aspect of the present disclosure stores an image processing program for causing a computer to implement: an image acquisition function of acquiring a monochrome image including a target part; a hint acquisition function of acquiring a category of the target part and a first color hint indicating a color of the target part; a hint conversion function of converting the first color hint into a second color hint indicating the color of the target part based on the acquired category; and a colorization generation function of generating a colorized image corresponding to the monochrome image from the monochrome image and the second color hint of the target part by using a prediction model trained by machine learning.

Advantageous Effects of Invention

According to the present disclosure, it is possible to provide an image processing system, an image processing method, and a non-transitory computer readable medium that more easily improve the reproduction accuracy of a color in colorization of a monochrome image.

BRIEF DESCRIPTION OF DRAWINGS

FIG. 7A is a diagram showing an example of a data structure of a first conversion table according to the first example embodiment;

FIG. 8A is a diagram showing an example of a data structure of a second conversion table according to the first example embodiment;

FIG. 9A is a diagram showing an example of a data structure of a third conversion table according to the first example embodiment;

EXAMPLE EMBODIMENT

Specific example embodiments will be described hereinafter in detail with reference to the drawings. The same or corresponding elements are denoted by the same reference symbols throughout the drawings, and redundant descriptions will be omitted as necessary for the clarification of the description. Note that, in the present specification, colors are specifically defined using a CIE L*a*b* color space standardized by the International Commission on Illumination (CIE) in 1976. However, the colors are not limited to being defined using the CIE L*a*b* color space, and they may instead be defined using any other color space such as RGB, HSV, and YCrCb. Hereinafter, L*, a*, and b* are simply referred to as L, a, and b, respectively.

Figure 1:
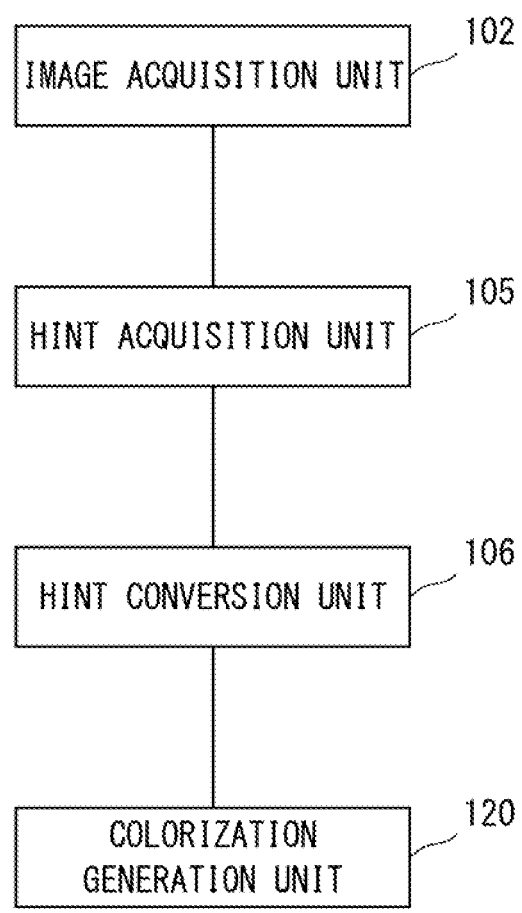
FIG. 1 is a block diagram showing a configuration of an apparatus according to an outline of example embodiments.

Prior to describing example embodiments in detail, an outline thereof will be briefly described first. FIG. 1 is a block diagram showing a configuration of an image processing system (simply referred to as an apparatus 10 in this example) according to an outline of the example embodiments. The apparatus 10 includes an image acquisition unit 102, a hint acquisition unit 105, a hint conversion unit 106, and a colorization generation unit 120.

The image acquisition unit 102 acquires a monochrome image of a subject including a target part.

The hint acquisition unit 105 acquires a category of the target part and a first color hint indicating a color of the target part.

The hint conversion unit 106 converts the first color hint into a second color hint indicating a color of the target part based on the acquired category.

The colorization generation unit 120 generates a colorized image corresponding to the monochrome image from the monochrome image and the second color hint of the target part by using a prediction model trained by machine learning.

By the above configuration, it is possible to perform color adjustment of the designated color hint based on the category of the target part and then perform colorization using the adjusted color hint. Therefore, it is possible to more easily improve the reproduction accuracy of the color in colorization of the monochrome image.

First Example Embodiment

Figure 2:
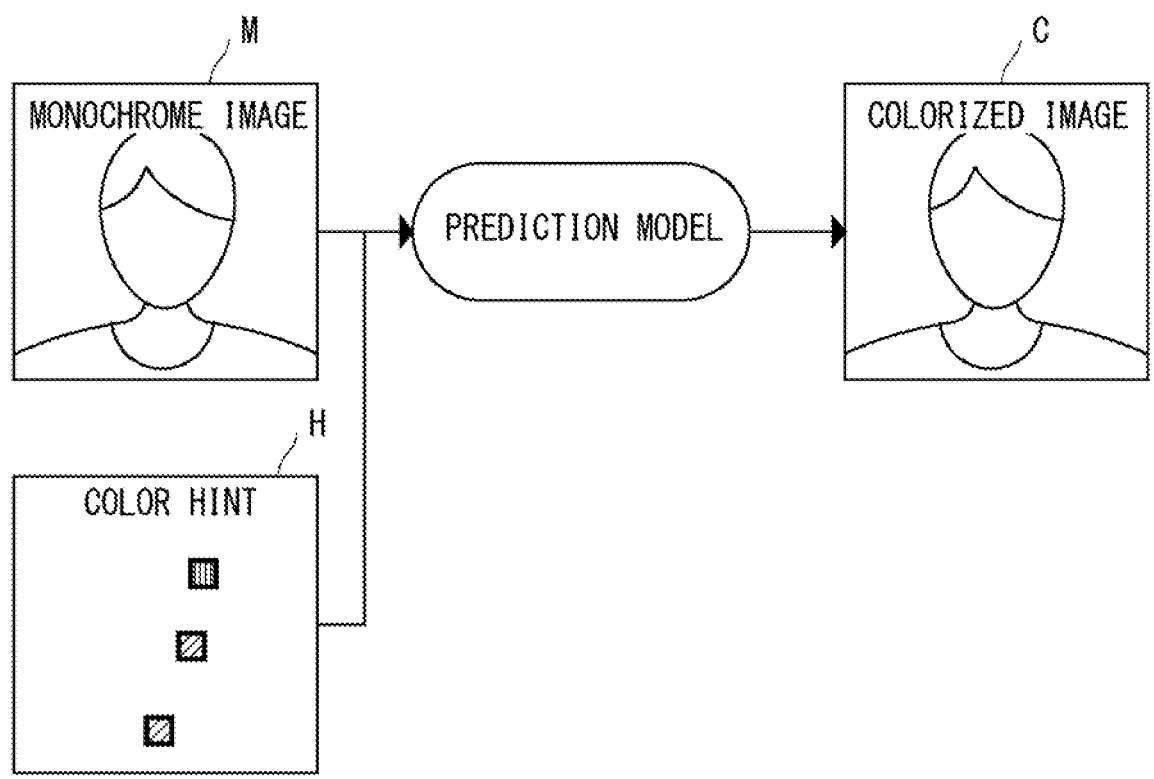
FIG. 2 is an outline of processes performed by an apparatus according to a first example embodiment.

Next, a first example embodiment of the present disclosure will be described with reference to FIGS. 2 to 9. FIG. 2 is an outline of an apparatus 20 according to the first example embodiment. The apparatus 20 is a computer or the like which colors a monochrome image M by using a prediction model based on the monochrome image M and a color hint H corresponding to the monochrome image M and thereby generates a colorized image C.

The monochrome image M is an image rendered using a background color and a single color other than the background color. The monochrome image M includes a number of pixels corresponding to "the number of pixels" thereof.

Each pixel of the monochrome image M includes a pixel value indicating a gradation between the background color and the single color. The pixel value of the monochrome image M includes a value of any dimension of the color space. In the first example embodiment, the pixel value of the monochrome image M includes a luminance value of the monochrome image M, for example, a value of L.

The monochrome image M is a photographic image including one or a plurality of subjects. The subject is, for example, a person, a sky, a sunset, a tree, and grass. In this example, the subject includes one or a plurality of target parts. The target parts are parts of the subject which are similar in color. The target part may be a pixel region including a plurality of adjacent pixels in which differences between the pixel values are within a predetermined range. Examples of the target part include the skin of a person, the eyes of a person, the clothes of a person, the sky, a sunset, the trunk of a tree, a leaf, and grass. In the first example embodiment, the monochrome image M may be a grayscale image using white as the background color and black as the single color. However, the monochrome image M is not limited to being the aforementioned grayscale image, and the monochrome image M may instead be an image using a color other than black as the single color. Further, the monochrome image M may be a monochrome halftone image subjected to diffusing processing using a Gaussian filter, a median filter, or the like.

The colorized image C includes a number of pixels corresponding to "the number of pixels" thereof, which pixels correspond to those of the monochrome image M. Each pixel of the colorized image C includes a value of a complementary color dimension in addition to a pixel value. The values of a complementary color dimension may be, for example, a value of a and a value of b.

The prediction model is a prediction model trained by machine learning, which prediction model predicts the colors of the pixels of the monochrome image M. The prediction model includes a neural network including, for example, an input layer, an intermediate layer, and an output layer. As an example, the neural network includes a convolutional neural network (CNN). Note that the neural network may include an autoencoder that compresses the dimension of the input layer, in particular, a conditional autoencoder. In the first example embodiment, although the prediction model is a model trained by an end-to-end deep learning, it is not limited thereto.

The color hint H is a color index indicating the color of the target part. In the first example embodiment, the color hint H is a color defined using a color space. The color hint H is a condition added to the prediction model. In particular, the color hint H may be a condition added to an autoencoder included in the neural network. The color hint H improves the accuracy of predicting the color of each pixel of the monochrome image M.

Note that the color hint H is preferably a "preferred color" as a photographic image, in particular, a color that conforms to human color perception. For example, the "preferred color" may have reflectance characteristics under predetermined light sources such as sunlight and white light sources.

Further, the "preferred color" may be a color empirically determined based on human color perception. Further, when the color difference between the color of an object under a predetermined light source and the color of an object displayed on a predetermined display apparatus is small (preferably minimal), the "preferred color" may be the color of an object displayed on a predetermined display apparatus. For example, the "preferred color" can be determined as follows. First, the color of an object is detected by a first image sensor, the detected color is then displayed on a predetermined display apparatus, and then the displayed color is further detected by a second image sensor. At this time, when the color difference between the color detected by the first image sensor and the color detected by the second image sensor becomes small (preferably minimal), the color detected by the second image sensor can be set to the "preferred color" of the object.

By setting the color hint H to the above "preferred color", it is possible to improve the reproduction accuracy of the color in the colorization of the monochrome image.

Figure 3:
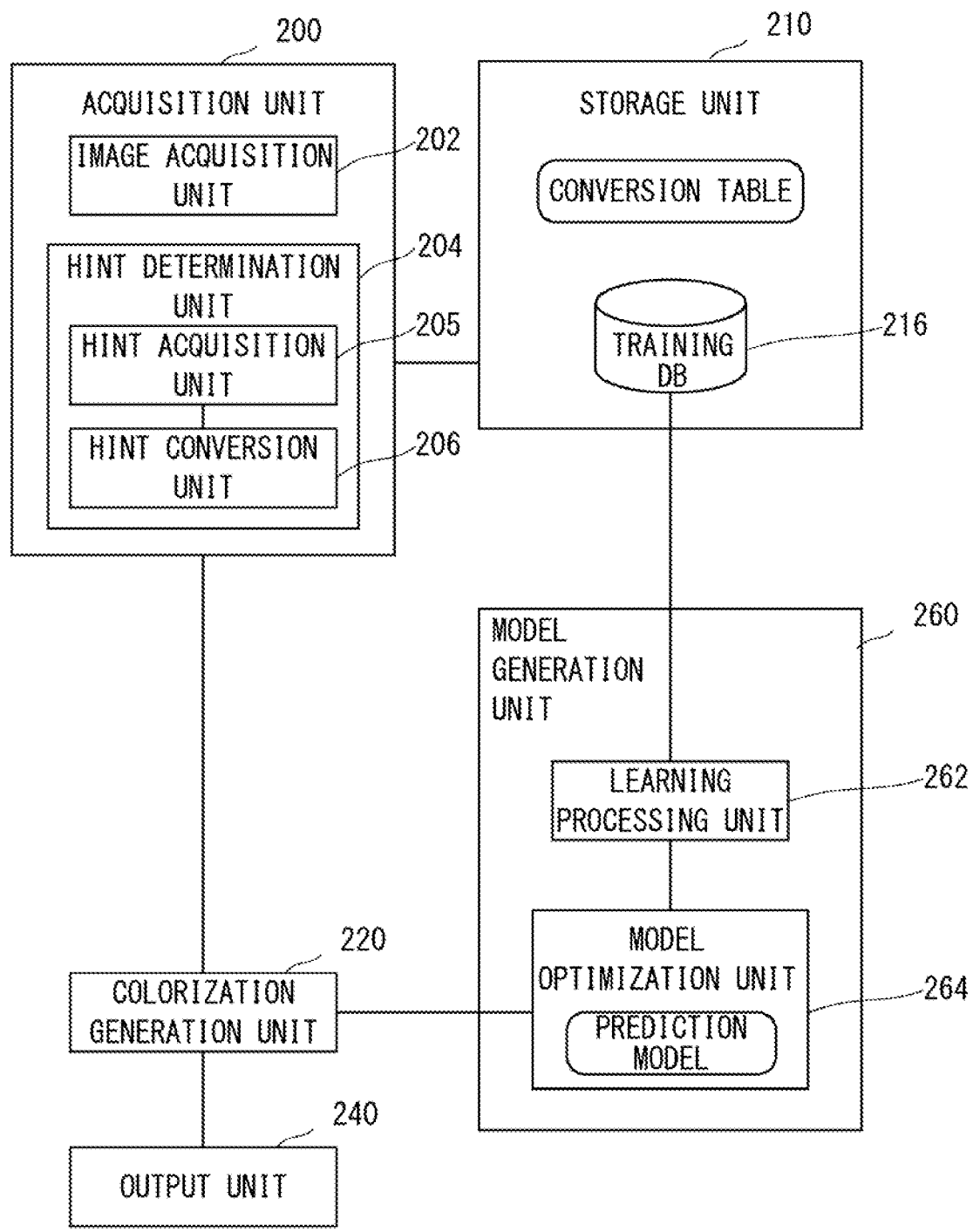
FIG. 3 is a schematic configuration diagram of the apparatus according to the first example embodiment.

FIG. 3 is a schematic configuration diagram of the apparatus 20 according to the first example embodiment. The apparatus 20 includes an acquisition unit 200, a storage unit 210, a colorization generation unit 220, an output unit 240, and a model generation unit 260.

The acquisition unit 200 acquires various types of data related to input data of the prediction model. The acquisition unit 200 outputs the acquired data to the colorization generation unit 220. In addition to outputting the acquired data, the acquisition unit 200 may store the acquired data in the storage unit 210. Note that the acquisition unit 200 includes an image acquisition unit 202 and a hint determination unit 204.

The image acquisition unit 202 acquires the monochrome image M which is one of the input data of the prediction model. The image acquisition unit 202 may acquire the monochrome image M and the colorized image C corresponding to the monochrome image M as training data.

The hint determination unit 204 acquires a first color hint of the target part of the subject in the monochrome image M and then determines a second color hint. Note that the first color hint is a color hint designated by a user as a color indicating the color of the target part of the subject. Further, the second color hint is a "preferred color" according to the first color hint and is a color hint input to the prediction model as a condition. The hint determination unit 204 outputs the determined second color hint to the colorization generation unit 220. Note that the hint determination unit 204 includes a hint acquisition unit 205 and a hint conversion unit 206.

The hint acquisition unit 205 acquires target position information P of the monochrome image M, a category of the target part, and the first color hint. Note that the category is information indicating the type of the target part, for example, "the skin of a person", "the eyes of a person", "the sky", "a sunset", "the trunk of a tree", "a leaf", and "grass". Further, the target position information P may be position information of at least some of the pixels which compose the target part.

The hint conversion unit 206 converts the first color hint into the second color hint based on the category acquired by the hint acquisition unit 205. The hint conversion unit 206 may convert the first color hint into the second color hint using a conversion table stored in the storage unit 210.

The storage unit 210 is a storage medium for storing various types of data and the like related to a color hint conversion process and a prediction model learning process. The storage unit 210 includes the conversion table and a training database 216.

The conversion table is a table for associating a category for the target part with parameters and the like related to a color hint conversion process and storing them. The details thereof will be described later.

The training database 216 stores training data and the like of the prediction model.

The colorization generation unit 220 generates the colorized image C corresponding to the monochrome image M from the monochrome image M and the color hint H (in particular, the second color hint) of the target part by using the prediction model. Note that the colorization generation unit 220 uses the prediction model output from a model optimization unit 264 of the model generation unit 260, which will be described later. Then the colorization generation unit 220 outputs the colorized image C to the output unit 240.

The output unit 240 outputs the colorized image C generated by the colorization generation unit 220 in a predetermined output format.

The model generation unit 260 generates a prediction model by machine learning using training data. The model generation unit 260 includes a learning processing unit 262 and the model optimization unit 264.

The learning processing unit 262 manages training data of the prediction model. The learning processing unit 262 acquires a data set including the monochrome image M, the colorized image C, and the color hint H for training, that is, the training data, and stores it in the training database 216. Note that the training data stored in the training database 216 may be data which the learning processing unit 262 has acquired from the acquisition unit 200 or data which the learning processing unit 262 has received from another apparatus via any communication means (not shown). Further, the learning processing unit 262 outputs the training data stored in the training database 216 to the model optimization unit 264.

The model optimization unit 264 optimizes the prediction model by machine learning using training data. A prediction model optimization unit 184 outputs the optimized prediction model to the colorization generation unit 220.

Figure 4:
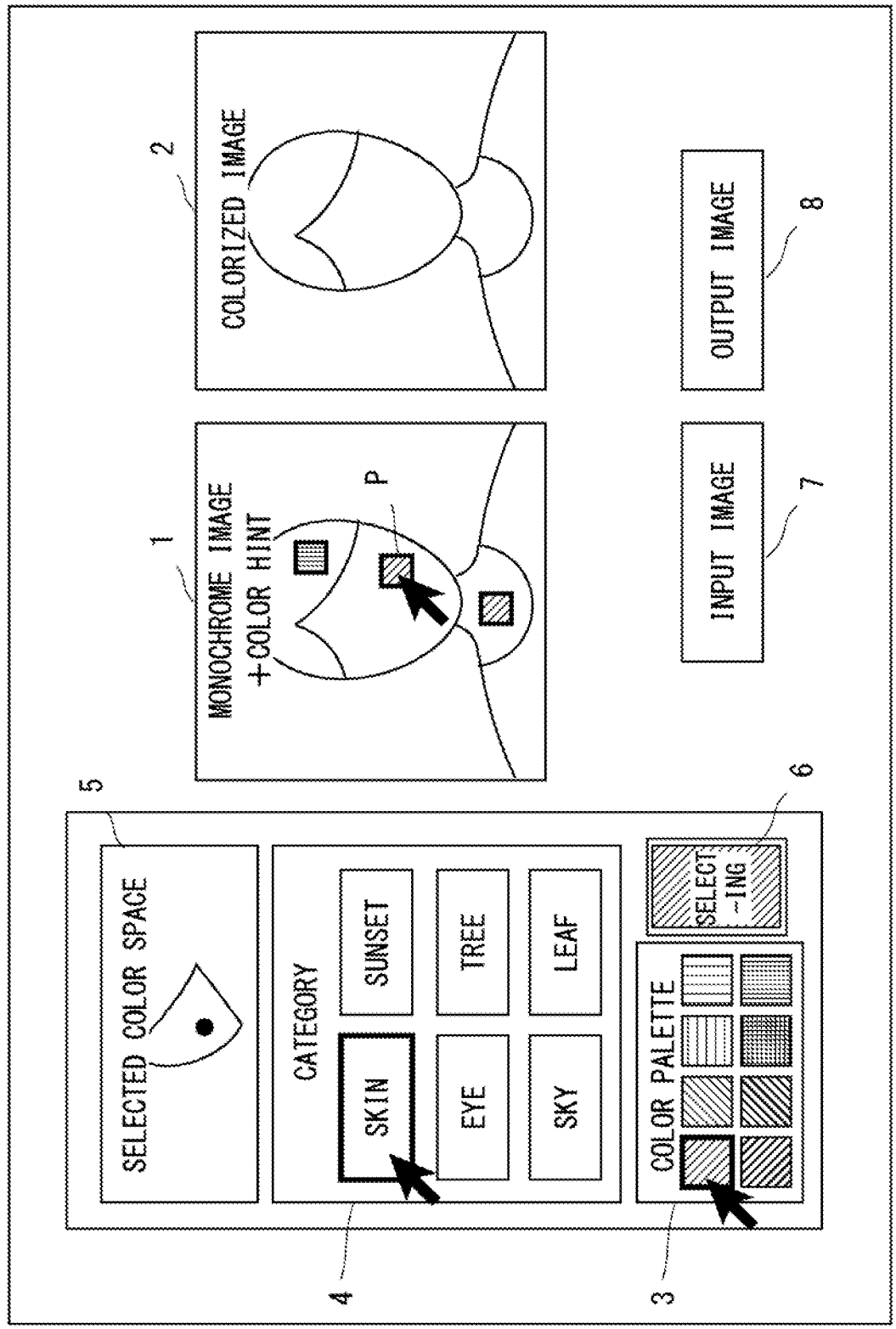
FIG. 4 is a diagram showing an example of a user interface of the apparatus according to the first example embodiment.

FIG. 4 is a diagram showing an example of a user interface of the apparatus 20 according to the first example embodiment. For example, the user interface includes a monochrome image display unit 1, a colorized image display unit 2, a color palette 3, a category input unit 4, a color space display unit 5, a hint display unit 6, an image input unit 7, and an image output unit 8.

The monochrome image display unit 1 superimposes the color indicated by the first color hint or the second color hint on the pixels corresponding to the target position information P of the target part of the acquired monochrome image M and displays this monochrome image M. Note that the monochrome image display unit 1 receives an input of the target position information P from a user via a pointing device or the like. The monochrome image display unit 1 may be included in the hint determination unit 204 and connected to the hint acquisition unit 205.

The colorized image display unit 2 displays the generated colorized image C. The colorized image display unit 2 is included in the output unit 240.

The color palette 3 is a general-purpose color palette that holds a plurality of colors and receives a designation of a color from a user. The designated color is the first color hint. The color palette 3 is included in the hint acquisition unit 205 of the hint determination unit 204.

The category input unit 4 displays a list of categories for the target part and receives an input of the category from a user. The category input unit 4 may be included in the hint determination unit 204 and connected to the hint acquisition unit 205.

The color space display unit 5 displays in the color space the color hint (the first color hint for which a designation is received from a user or the converted second color hint) selected at this point in time. The color space display unit 5 may receive a designation of a color (i.e., an input of the first color hint) from a user via a pointing device or the like. The hint display unit 6 displays the color hint selected at this point in time by a color.

The image input unit 7, which is included in the image acquisition unit 202, receives an input of the monochrome image M from a user.

The image output unit 8, which is included in the output unit 240, outputs the colorized image C to the outside in a predetermined data format.

Figure 5:
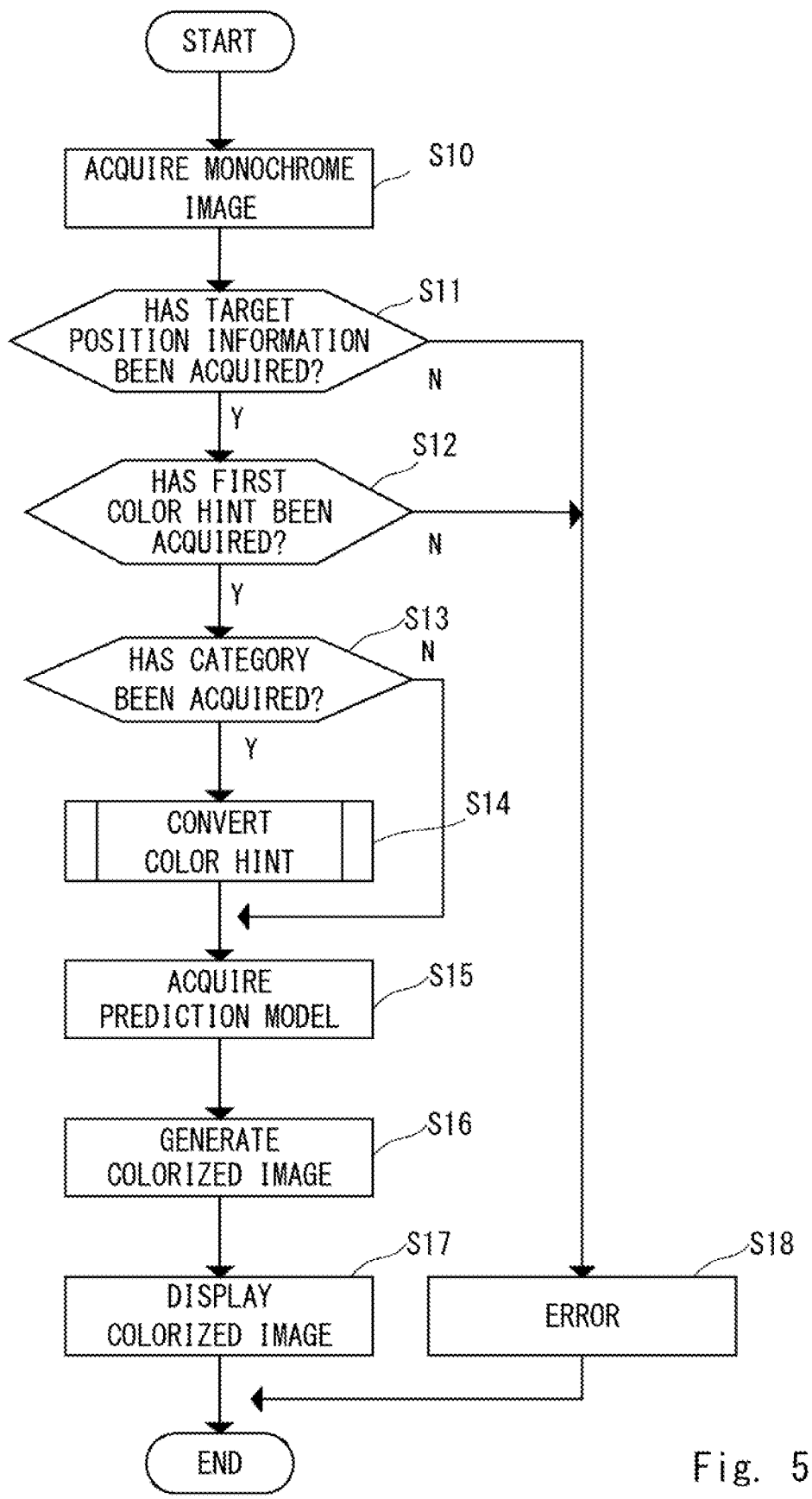
FIG. 5 is a flowchart showing the processes performed by the apparatus according to the first example embodiment.

Next, processes performed by the apparatus 20 according to the first example embodiment will be described with reference to FIGS. 4 and 5. FIG. 5 is a flowchart showing the processes performed by the apparatus 20 according to the first example embodiment.

First, in S10, the image acquisition unit 202 of the acquisition unit 200 acquires the monochrome image M to be colorized. For example, the image acquisition unit 202 performs the above process when a user selects the image input unit 7 shown in FIG. 4 and transfers the predetermined monochrome image M. Then the image acquisition unit 202 outputs the acquired monochrome image M to the colorization generation unit 220.

Next, in S11, the hint acquisition unit 205 determines whether or not it has acquired the target position information P of the target part. For example, the hint acquisition unit 205 determines whether or not a user has designated at least some pixels on the monochrome image display unit 1 shown in FIG. 4 by means of a pointing device or the like. If the hint acquisition unit 205 has acquired the target position information P (the user has designated the pixels) (Y in S11), it advances the process to S12, while if the hint acquisition unit 205 has not acquired the target position information P (the user has not designated the pixels) (N in S11), it advances the process to S18.

In S12, the hint acquisition unit 205 determines whether or not it has acquired the first color hint of the target part. For example, the hint acquisition unit 205 determines whether or not a user has designated a color included in the color palette 3 shown in FIG. 4 or a color displayed on the color space display unit 5. If the hint acquisition unit 205 has acquired the first color hint (the user has designated the color) (Y in S12), the hint acquisition unit 205 superimposes the color indicated by the first color hint on the pixels of the monochrome image M of the monochrome image display unit 1 corresponding to the target position information P and displays it as shown in FIG. 4, and advances the process to S13. If the hint acquisition unit 205 has not acquired the first color hint (the user has not designated the color) (N in S12), it advances the process to S18.

In S13, the hint acquisition unit 205 determines whether or not it has acquired the category of the target part. For example, the hint acquisition unit 205 determines whether or not a user has designated the category displayed in the category input unit 4. If the hint acquisition unit 205 has acquired the category (the user has designated the category) (Y in S13), the hint acquisition unit 205 advances the process to S14, while if the hint acquisition unit 205 has not acquired the category (the user has not designated the category) (N in S13), it outputs the first color hint to the colorization generation unit 220 and advances the process to S15.

In S14, the hint conversion unit 206 refers to the conversion table of the storage unit 210 and converts the first color hint into the second color hint in accordance with the acquired category. Details of this process for converting the color hint will be described later. The hint conversion unit 206 outputs the second color hint to the colorization generation unit 220. Further, as shown in FIG. 4, the hint conversion unit 206 superimposes the color indicated by the second color hint, instead of the color indicated by the first color hint, on the pixels of the monochrome image M of the monochrome image display unit 1 corresponding to the target position information P and displays it.

Next, in S15, the colorization generation unit 220 acquires the prediction model from the model optimization unit 264.

Next, in S16, the colorization generation unit 220 uses the acquired monochrome image M as input data and generates the colorized image C corresponding to the monochrome image M with the color hint H (the first color hint or the second color hint) as a condition by using the prediction model. The colorization generation unit 220 outputs the colorized image C to the output unit 240.

In S17, the output unit 240 outputs the colorized image C. For example, the output unit 240 displays the colorized image C in the colorized image display unit 2 shown in FIG. 4. Further, the output unit 240 outputs the colorized image C in a predetermined data format when a user selects the image output unit 8 shown in FIG. 4. Then the output unit 240 ends the process.

In S18, the hint acquisition unit 205 outputs a signal indicating an error when it has not acquired the target position information P in S11 or when it has not acquired the first color hint of the target part in S12. Then the hint acquisition unit 205 ends the process.

As described above, according to the first example embodiment, since the hint conversion unit 206 converts the first color hint into the second color hint based on the categories, it is possible to perform color adjustment of the designated color hint based on the categories and then perform colorization using the color hint on which the color adjustment has been performed. Thus, it is possible to more easily improve the reproduction accuracy of the color in colorization of the monochrome image.

Figure 6:
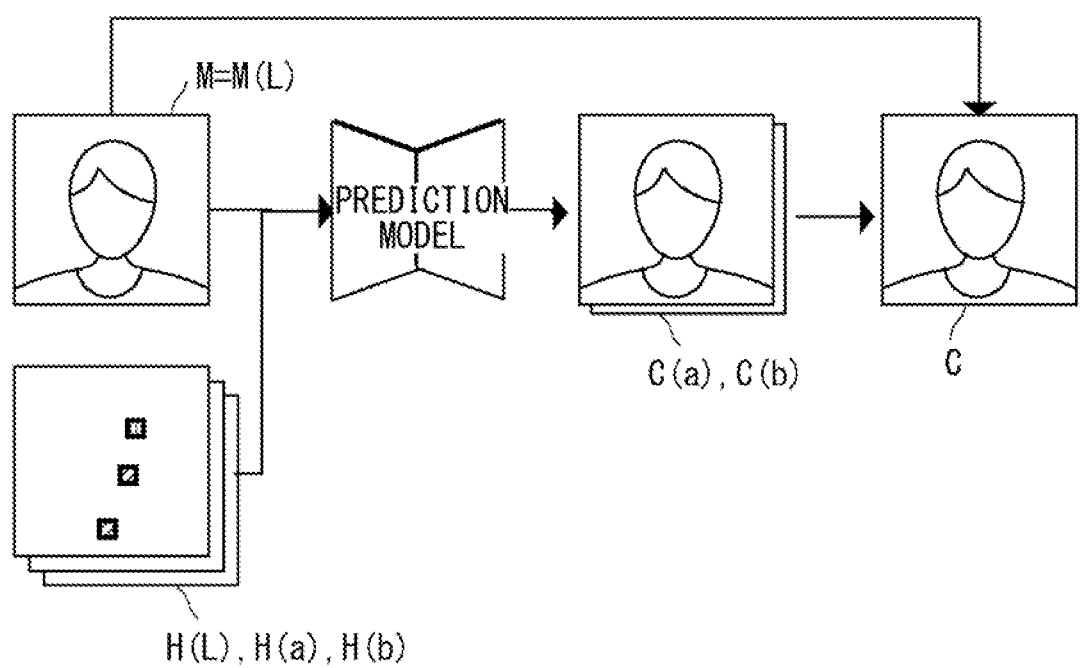
FIG. 6 is a diagram for explaining an example of a colorized image generation process performed by a colorization generation unit according to the first example embodiment.

FIG. 6 is a diagram for explaining an example of the colorized image generation process (i.e., the process of S16 in FIG. 5) performed by the colorization generation unit 220 according to the first example embodiment.

First, the colorization generation unit 220 acquires the monochrome image M, that is, a matrix diagram M(L) corresponding to a luminance dimension (L) of the monochrome image M, and matrix diagrams H(L), H(a), H(b) respectively corresponding to the luminance of the color hint H and complementary color dimensions (a, b). The colorization generation unit 220 inputs these diagrams into the input layer and the conditions of the prediction model. Then the prediction model outputs matrix diagrams C(a) and C(b) corresponding to the complementary color dimensions of the colorized image C in the output layer. The colorization generation unit 220 composes the output C(a), C(b), and M(L) on each other and thereby generates the colorized image C.

In this way, the colorization generation unit 220 can generate the colorized image C from the monochrome image M and the color hint H.

Next, the color hint conversion process (i.e., the process of S14 shown in FIG. 5) using a conversion table performed by the hint conversion unit 206 will be described. The conversion table may include at least one of a first conversion table, a second conversion table, and a third conversion table, and the hint conversion unit 206 may perform the conversion process in accordance with the type of the conversion table stored in the storage unit 210.

Figure 7B:
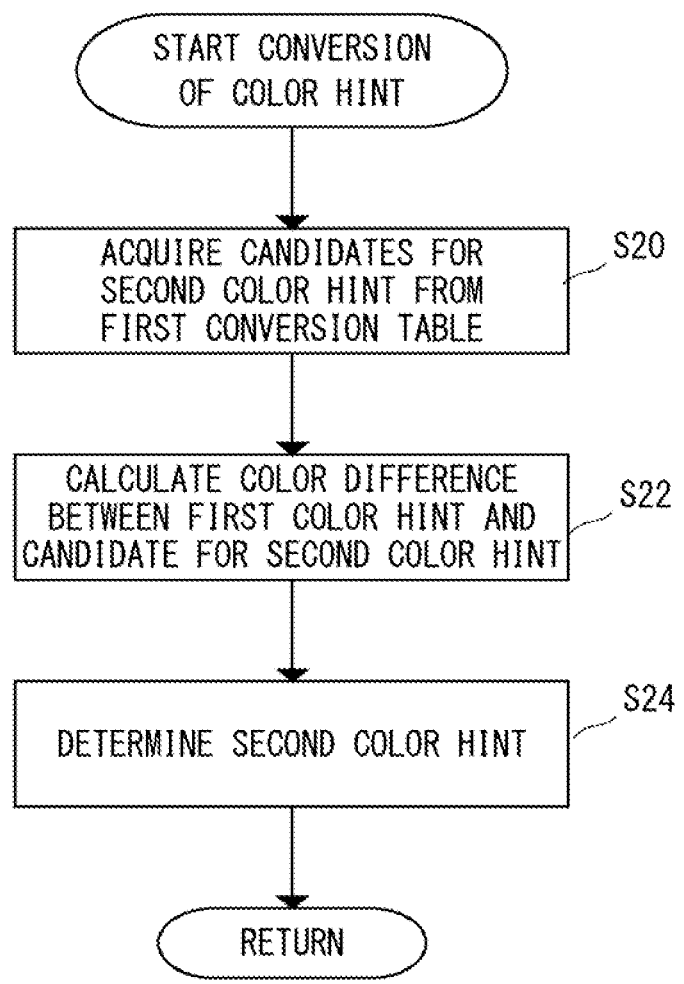
FIG. 7B is a flowchart showing a color hint conversion process using the first conversion table according to the first example embodiment.

FIG. 7A is a diagram showing an example of a data structure of the first conversion table according to the first example embodiment, and FIG. 7B is a flowchart showing the color hint conversion process using the first conversion table.

The first conversion table is a table for associating the category of the target part with a plurality of candidates for the second color hint and storing them. As shown in FIG. 7A, the first conversion table may include the category of the target part and color space coordinates of the plurality of candidates for the second color hint corresponding to the category. The color space coordinates include components (i.e., pixel values) corresponding to the dimensions of the color space, and in FIG. 7A, the color space coordinates include three components L, a, and b respectively corresponding to the luminance dimension (L) and the complementary color dimensions. Note that the candidate for the second color hint may be a color predetermined as the above-described "preferred color" in accordance with the category.

As shown in FIG. 7B, in S20, the hint conversion unit 206 first acquires the color space coordinates of the plurality of candidates for the second color hint corresponding to the acquired category by using the first conversion table.

Next, in S22, the hint conversion unit 206 calculates a color difference between the first color hint and each of the candidates for the second color hint, that is, a distance between the color space coordinates of the first color hint and the color space coordinates of each of the candidates for the second color hint. Note that the distance may be the Euclidean distance, the Manhattan distance, the Chebyshev distance, or any other distance.

Next, in S24, the hint conversion unit 206 selects the candidate for the second color hint in which a color difference between it and the first color hint is the smallest from among the candidates for the second color hint, and determines the selected candidate as the second color hint.

As described above, by using the first conversion table, the hint conversion unit 206 can easily determine, as the second color hint, the color closest to the color (the first color hint) designated by a user among the preferred colors predetermined for the respective categories.

Figure 8B:
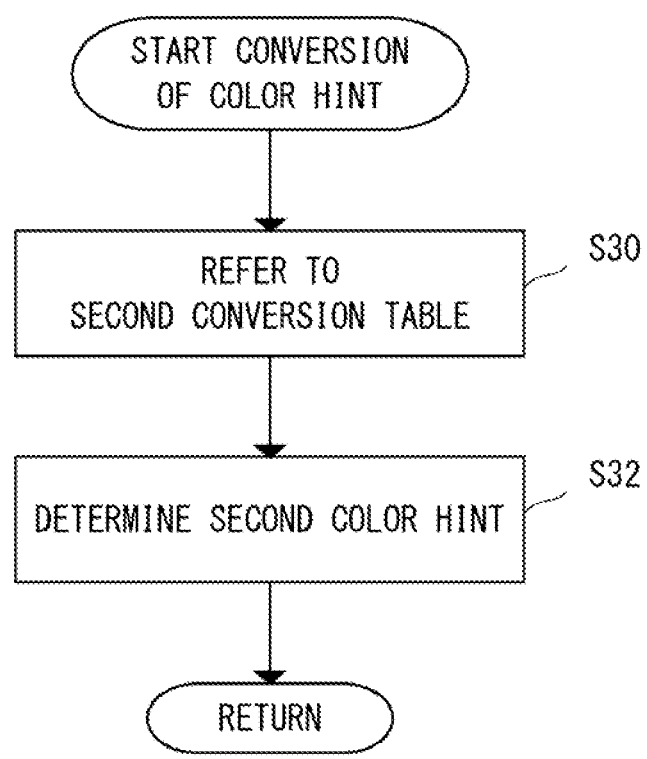
FIG. 8B is a flowchart showing a color hint conversion process using the second conversion table according to the first example embodiment.

FIG. 8A is a diagram showing an example of a data structure of the second conversion table according to the first example embodiment, and FIG. 8B is a flowchart showing the color hint conversion process using the second conversion table.

The second conversion table is a table for associating the first color hint, the category of the target part, and the second color hint with each other and storing them. As shown in FIG. 8A, the second conversion table stores, as the second color hint, color space coordinates assigned in accordance with a range of the color space coordinates of the first color hint for each category. Note that the second color hint may be a color predetermined as the above-described "preferred color" corresponding to the color space of the first color hint for each category.

As shown in FIG. 8B, in S30, the hint conversion unit 206 first refers to the second conversion table.

Next, in S32, the hint conversion unit 206 acquires the second color hint associated with a range corresponding to the acquired category and components of the color space coordinates of the first color hint.

As described above, by using the second conversion table, the hint conversion unit 206 can easily determine, as the second color hint, the "preferred color" predetermined so that it corresponds to the color designated by a user for each category.

Figure 9B:
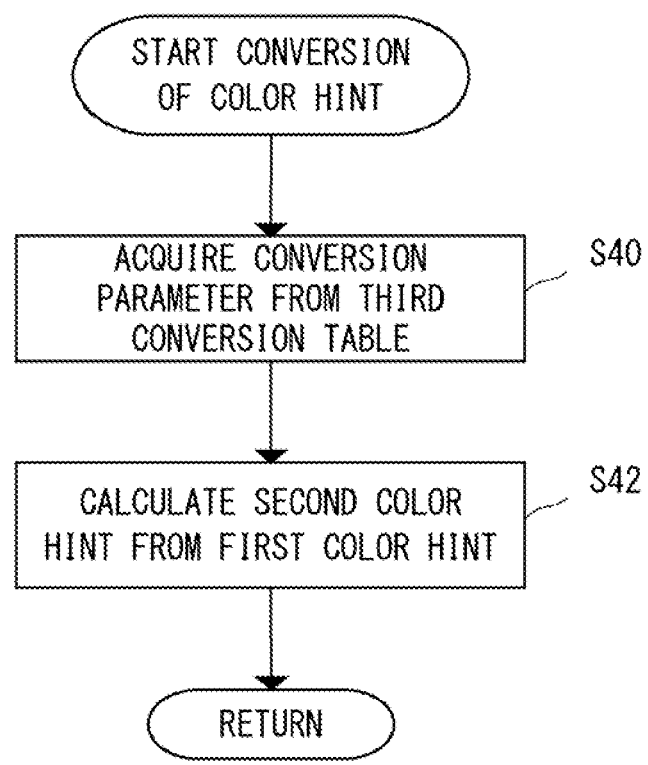
FIG. 9B is a flowchart showing a color hint conversion process using the third conversion table according to the first example embodiment.

FIG. 9A is a diagram showing an example of a data structure of the third conversion table according to the first example embodiment, and FIG. 9B is a flowchart showing the color hint conversion process using the third conversion table.

As shown in FIG. 9A, the third conversion table stores a conversion parameter for converting the first color hint into the second color hint, which parameter corresponds to the category of the target part.

As shown in FIG. 9B, in S40, the hint conversion unit 206 first acquires the conversion parameter corresponding to the acquired category, which parameter is stored in the third conversion table.

Next, as shown in S42, the hint conversion unit 206 calculates the second color hint from the first color hint using the conversion parameters.

As described above, by using the third conversion table, the hint conversion unit 206 can perform arithmetic processing on the color designated by a user based on the conversion parameters predetermined for the respective categories and easily determine a result of the output as the second color hint.

Note that, in the first example embodiment, although the training database 216 is included in the storage unit 210 of the apparatus 20, it may instead be included in another apparatus (not shown) or the like that is connected to the apparatus 20 so as to be able to communicate with the apparatus 20. At this time, the learning processing unit 262 may acquire training data from the other apparatus via any communication means (not shown) and output it to the model optimization unit 264.

Second Example Embodiment

Next, a second example embodiment of the present disclosure will be described with reference to FIGS. 10 to 12.

The second example embodiment is characterized in that the converted second color hint is further adjusted.

Figure 10:
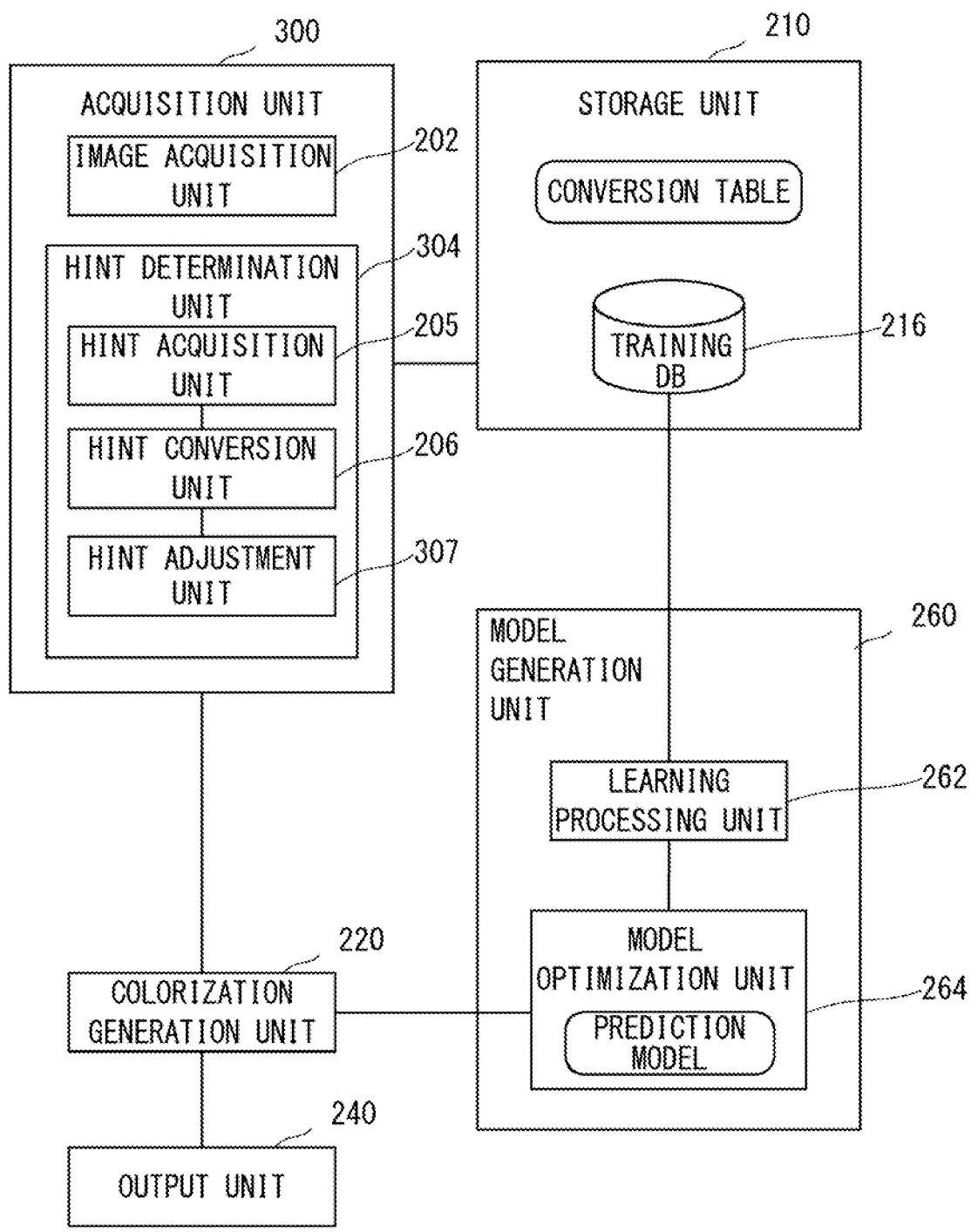
FIG. 10 is a schematic configuration diagram of an apparatus according to a second example embodiment.

FIG. 10 is a schematic configuration diagram of an apparatus 30 according to the second example embodiment. The configurations and the functions of the apparatus 30 are substantially similar to those of the apparatus 20 according to the first example embodiment. However, the apparatus 30 differs from the apparatus 20 in that the apparatus 30 includes an acquisition unit 300 in place of the acquisition unit 200.

The configurations and the functions of the acquisition unit 300 are substantially similar to those of the acquisition unit 200, except that the acquisition unit 300 includes a hint determination unit 304 in place of the hint determination unit 204.

The hint determination unit 304 has the configuration of the hint determination unit 204 and includes a hint adjustment unit 307.

The hint adjustment unit 307 adjusts the converted color space coordinates of the second color hint output from the hint conversion unit 206 based on the distance between the converted color space coordinates of the second color hint and the color space coordinates of the first color hint.

Figure 11:
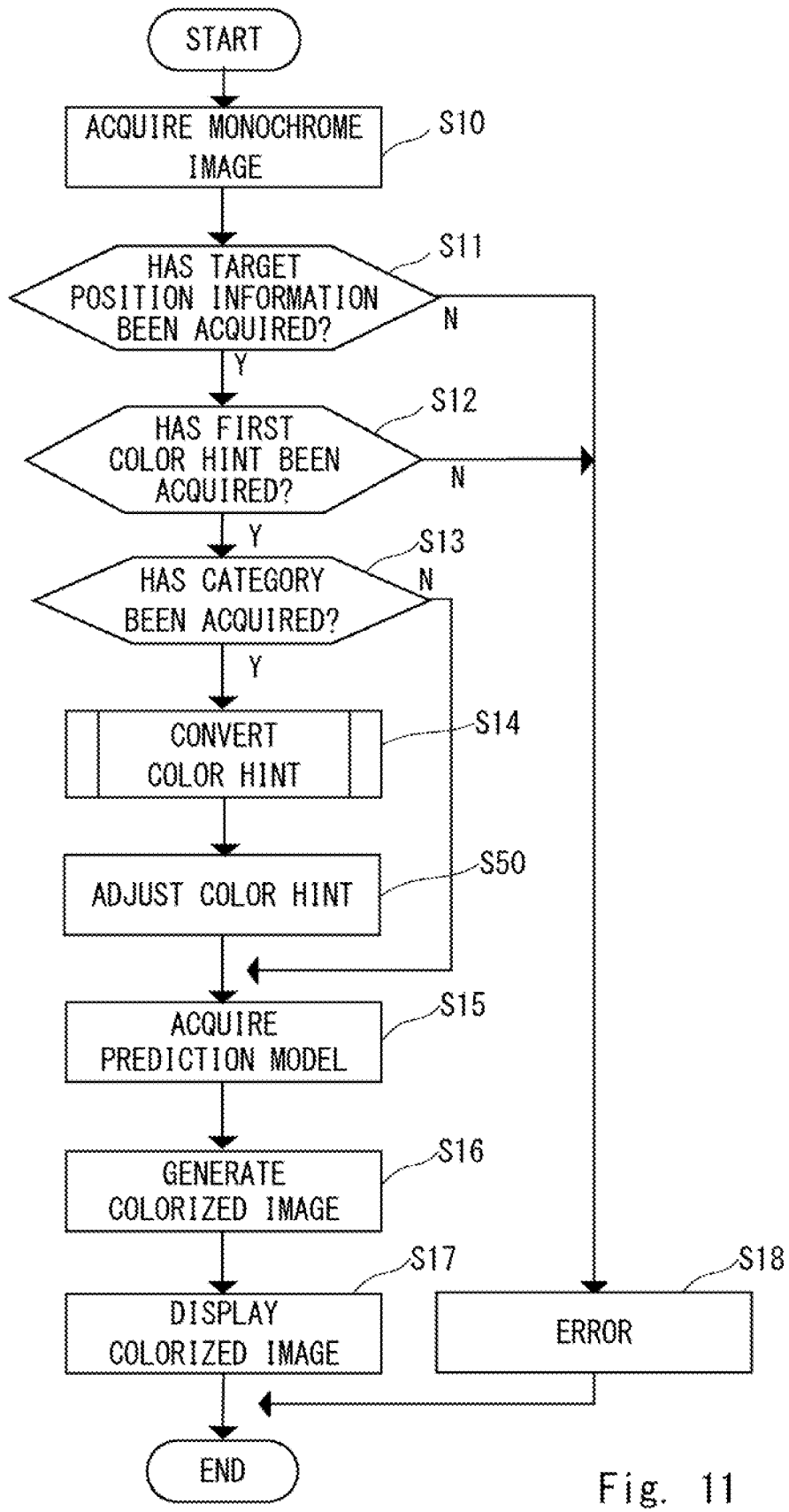
FIG. 11 is a flowchart showing processes performed by the apparatus according to the second example embodiment.

FIG. 11 is a flowchart showing processes performed by the apparatus 30 according to the second example embodiment. Steps shown in FIG. 11 include S50 in addition to Steps shown in FIG. 5 according to the first example embodiment. Note that Steps similar to those shown in FIG. 5 are denoted by the same reference symbols and the descriptions thereof will be omitted.

In S50, the hint adjustment unit 307 of the hint determination unit 304 performs a color hint adjustment process in response to the output of the second color hint from the hint conversion unit 206 in S14. Then the hint adjustment unit 307 outputs the second color hint to the colorization generation unit 220, and advances the process to S15.

Note that, in S16, the colorization generation unit 220 generates the colorized image corresponding to the monochrome image based on the adjusted second color hint.

Figure 12:
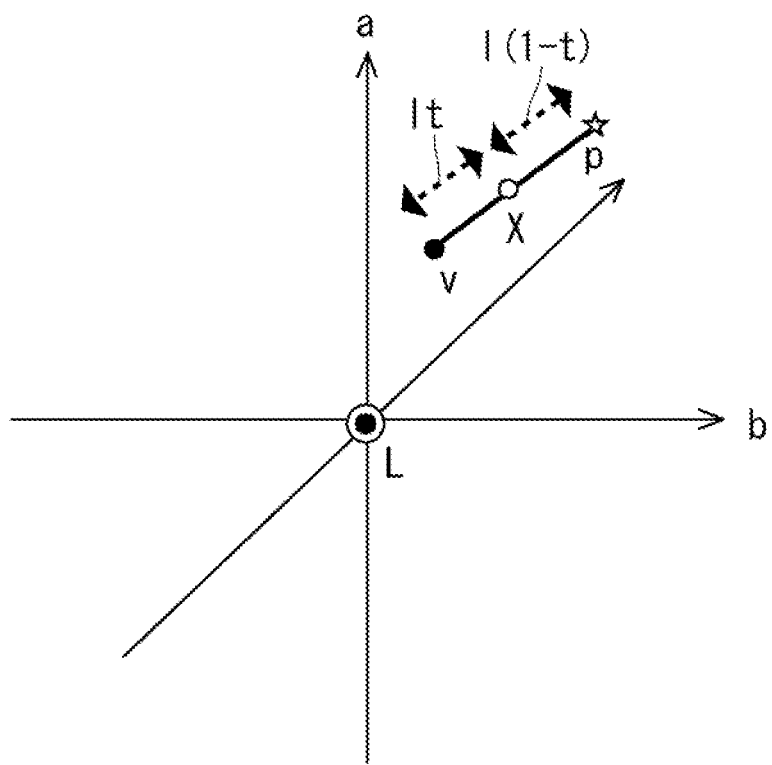
FIG. 12 is a conceptual diagram for explaining a color hint adjustment process according to the second example embodiment.

FIG. 12 is a conceptual diagram for explaining the color hint adjustment process (i.e., the process of S50 in FIG. 11) according to the second example embodiment. A point v shown in FIG. 12 is the color space coordinate of the first color hint acquired by the hint acquisition unit 205 (i.e., designated by a user) in S12. Further, a point p is the color space coordinate of the second color hint (i.e., the "preferred color") converted by the hint conversion unit 206 in S14. Further, a point X is the color space coordinate of the second color hint adjusted by the hint adjustment unit 307 in S50.

The hint adjustment unit 307 adjusts the color of the converted second color hint by setting the point X on a straight line connecting the point p to the point v. As a result of doing so, the hint adjustment unit 307 can perform processing to make the second color hint close in color to the "preferred color" by a predetermined degree relative to the first color hint or make it differ in color from the "preferred color" by a predetermined degree relative to the first color hint.

For example, FIG. 12 shows an example of a case in which the hint adjustment unit 307 sets the point X between the points v and p in the color space, that is, a case in which the second color hint is made close to the "preferred color" by a predetermined degree. For example, the distance between the points v and p is defined as l, and the color space coordinates of the points v, p, and X are defined as v, p, and X, respectively, using a position vector. Further, a parameter indicating how close a color is made to the "preferred color" is defined as $t(-1 \leq t \leq 1)$. In FIG. 12, $t>0$ holds, and $X = 1 \cdot tv + 1 \cdot (1-t) \cdot p$ is obtained.

Further, when $t<0$ holds, the hint adjustment unit 307 can also set the point X at a position opposite to the point p with respect to the point v on a straight line connecting the point v to the point p in the color space. That is, the hint adjustment unit 307 can make the second color hint differ in color from the "preferred color" by a predetermined degree.

As described above, according to the second example embodiment, the apparatus 30 can perform colorization with preferences of a user based on the predetermined "preferred color".

Third Example Embodiment

Next, a third example embodiment of the present disclosure will be described with reference to FIGS. 13 to 15. The third example embodiment is characterized in that the target position information P of the monochrome image M is automatically acquired.

Figure 13:
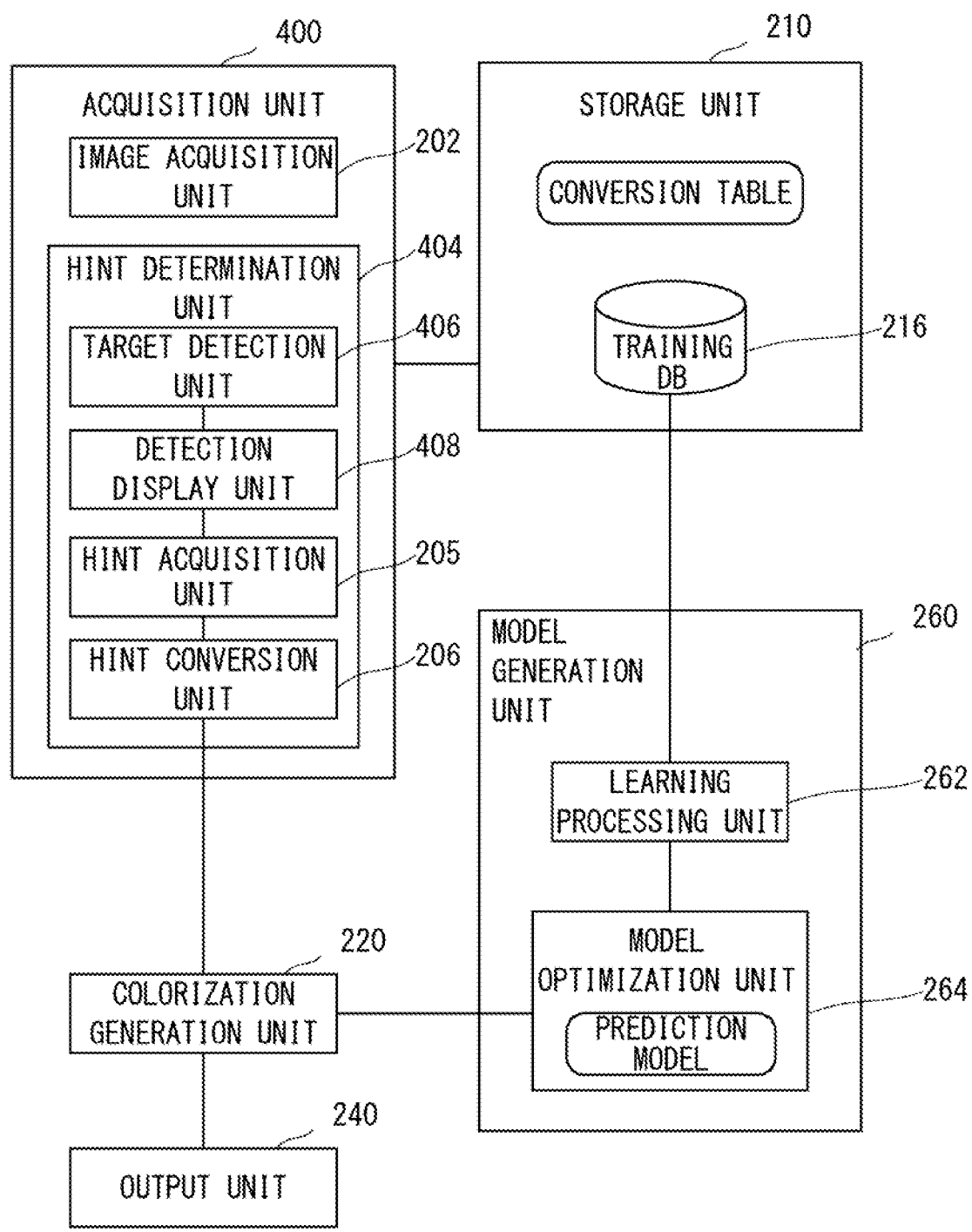
FIG. 13 is a schematic configuration diagram of an apparatus according to a third example embodiment.

FIG. 13 is a schematic configuration diagram of an apparatus 40 according to the third example embodiment. The configurations and the functions of the apparatus 40 are substantially similar to those of the apparatus 20 according to the first example embodiment. However, the apparatus 40 includes an acquisition unit 400 in place of the acquisition unit 200.

The configurations and the functions of the acquisition unit 400 are substantially similar to those of the acquisition unit 200, except that the acquisition unit 400 includes a hint determination unit 404 in place of the hint determination unit 204.

The hint determination unit 404 has the configuration of the hint determination unit 204 and includes a target detection unit 406 and a detection display unit 408.

The target detection unit 406 automatically detects the target part from the monochrome image M and acquires the target position information P. For example, the target detection unit 406 may detect a subject, and then detect pixel regions of the subject which it is estimated are similar in color to each other as the target part. Note that the target detection unit 406 may detect pixel regions which it is estimated are similar in color to each other based on differences between pixel values of the pixels included in the subject and positions of the pixels.

Then the target detection unit 406 estimates the category of the target part based on the detected target part. The target detection unit 406 outputs the estimated category to the hint conversion unit 206.

The detection display unit 408 selects the detected the target part and displays it. Therefore, a user can designate the first color hint without having to designate the target position information P of the target part. Note that the detection display unit 408 may display the detected subject in addition to the target part.

Note that the hint acquisition unit 205 may accept the input of the first color hint corresponding to the displayed target part from a user.

According to the third example embodiment, since the target detection unit 406 automatically detects the target position information P, an operation of designating the target position information P performed by a user is omitted, whereby a user's convenience is improved. Further, since the target detection unit 406 estimates the category of the target part when the target position information P is automatically detected, it is possible to automatically acquire the category of the target part. Thus, an operation of designating the category performed by a user is omitted, whereby a user's convenience is further improved.

Next, processes performed by the apparatus 40 according to the third example embodiment will be described with reference to FIGS. 14 and 15. FIG. 14 is a flowchart showing the processes performed by the apparatus 40 according to the third example embodiment. Further, FIG. 15 is a diagram showing an example of a user interface of the apparatus 40 according to the third example embodiment.

Figure 14:
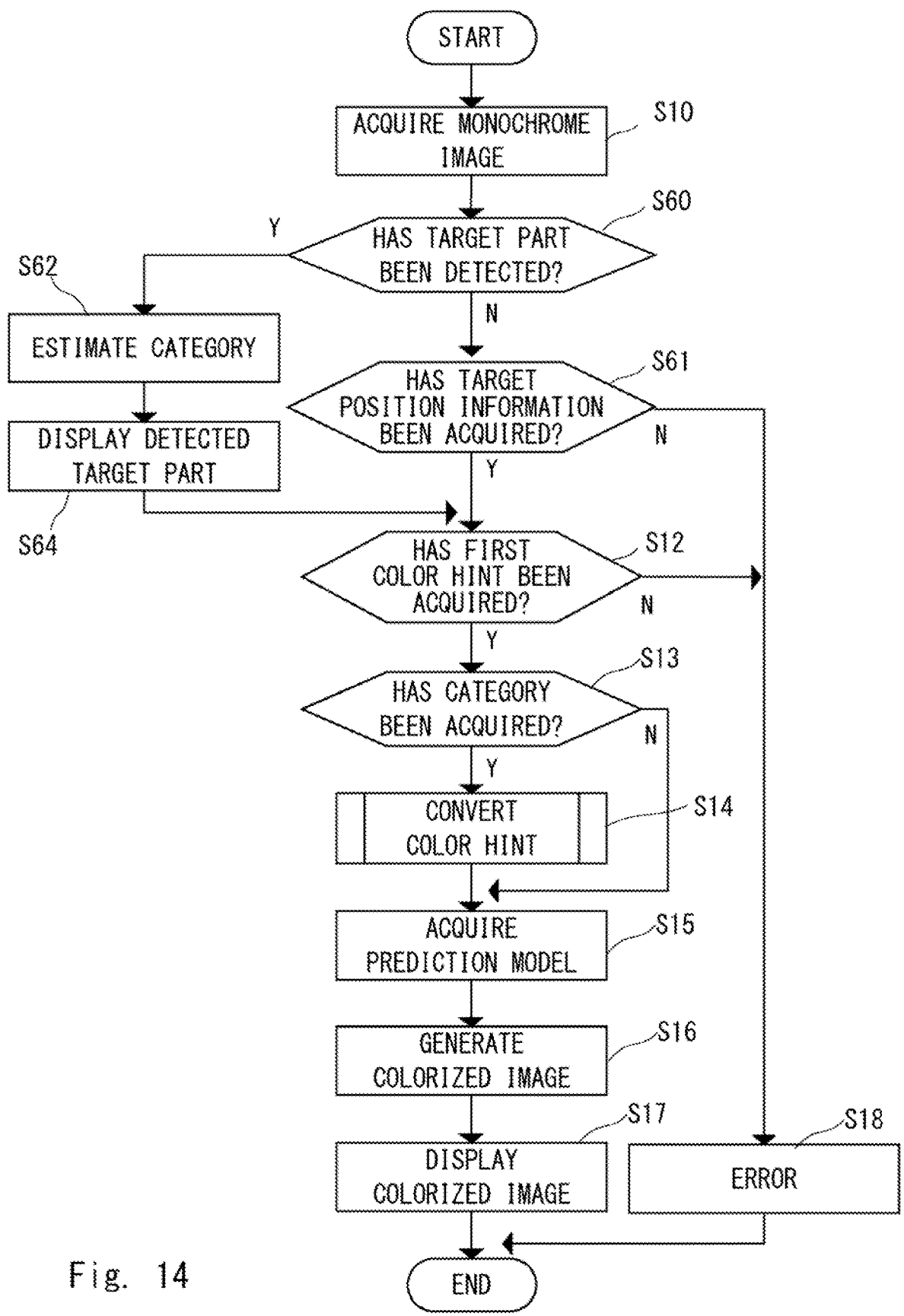
FIG. 14 is a flowchart showing processes performed by the apparatus according to the third example embodiment.

Instead of Step S11 shown in FIG. 5 according to the first example embodiment, Steps shown in FIG. 14 include Steps S60 to S64. Note that Steps similar to those shown in FIG. 5 are denoted by the same reference symbols and the descriptions thereof will be omitted.

In S60, when the image acquisition unit 202 has acquired in S10 the monochrome image M to be colorized, the target detection unit 406 automatically detects the subject and the target part of the subject from the monochrome image M, thereby determining whether or not it has acquired the target position information P.

If the target detection unit 406 determines that it has acquired the target position information P (Y in S60), it advances the process to S62, while if the target detection unit 406 determines that it has not acquired the target position information P (N in S60), it advances the process to S61.

In S61, the hint acquisition unit 205 performs a process similar to that performed in S11 of FIG. 5; that is, if the hint acquisition unit 205 has acquired the target position information P (Y in S11), it advances the process to S12, while if the hint acquisition unit 205 has not acquired the target position information P (N in S11), it advances the process to S18.

In S62, the target detection unit 406 estimates the category of the detected target part in response to the acquisition of the target position information P in S60. Then, as shown in FIG. 15, the estimated category is displayed on the category input unit 4.

Note that Steps S60 and S62 may be executed in parallel. Note that the target detection unit 406 may detect the subject and the target part using a predetermined object recognition model trained by machine learning, acquire the target position information P, and then estimate the category of the target part. The predetermined object recognition model may include a neural network, in particular, a CNN, which detects objects from an image and recognizes them.

Further, when the subject is a person or the like, the target detection unit 406 may detect the subject by using the predetermined object recognition model and estimate the positions of the face, the arms, the legs, and the like of the person or the like by using, for example, a skeleton estimation technique. Then the target detection unit 406 may use these estimated positions as the target position information P of the target part, and estimate that the category of the target part is "the skin of a person". Thus, even when the target parts of the same categories are present in a state in which they are separated from each other, it is possible to prevent a user from designating the first hint a plurality of times in S12 subsequent to S11, whereby a user's convenience is improved.

Note that, in the third example embodiment, the target detection unit 406 recognizes the target part from the monochrome image M by using a rectangular frame, and thus acquires the target position information P and the category. However, the target detection unit 406 may instead acquire the target position information P by estimating which category each region of the monochrome image M belongs to using Semantic Segmentation.

In S64, the detection display unit 408 displays a detected subject F and pixels corresponding to the target position information P of the target part on the monochrome image display unit 1. For example, as shown in FIG. 15, the monochrome image display unit 1 may superimpose a rectangular frame indicating the detected subject F and the pixels corresponding to the target position information P on the acquired monochrome image M and display it.

Note that when the target detection unit 406 uses Semantic Segmentation, a frame or the like surrounding the outline of the detected region may be superimposed as the detected subject F on the monochrome image M and displayed. Then the detection display unit 408 advances the process to S12.

Note that when the monochrome image M includes a plurality of detected target parts, the detection display unit 408 may sequentially display the detected target parts and request the hint acquisition unit 205 to prompt a user to input the first color hint.

Figure 15:
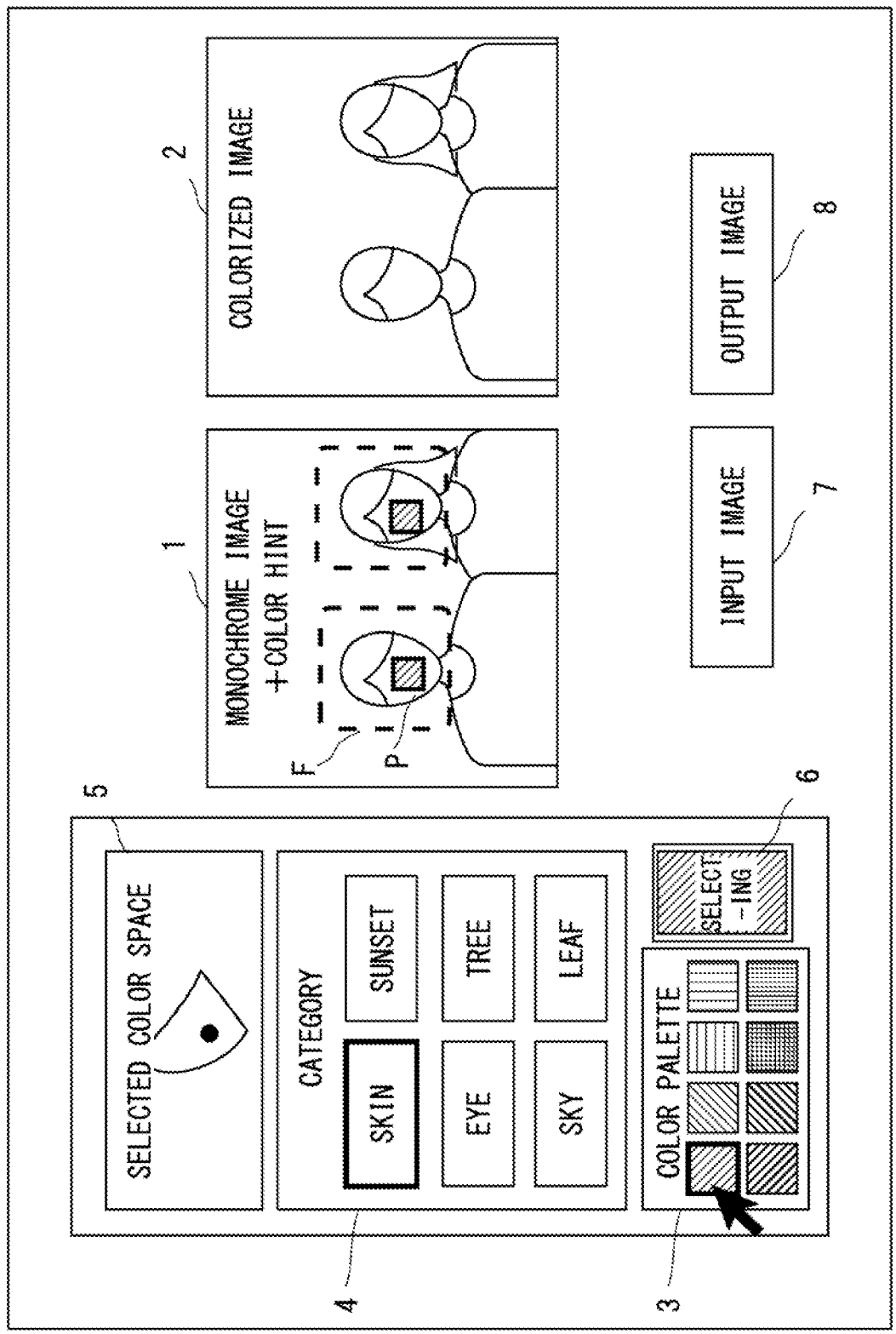
FIG. 15 is a diagram showing an example of a user interface of the apparatus according to the third example embodiment.

Further, as shown in FIG. 15, when the monochrome image M includes a plurality of target parts of the same category, the detection display unit 408 may select the plurality of target parts at a time and display them on the monochrome image display unit 1. By doing so, it is possible to prevent a user from designating the first color hint a plurality of times in S12 subsequent to S11, whereby a user's convenience is improved.

In the above-described example embodiments, a computer is composed of a computer system including a personal computer, a word processor, etc. However, the computer is not limited thereto and may be composed of a Local Area Network (LAN) server, a host of computer (personal computer) communications, a computer system connected on the Internet, etc. Further, functions may be distributed over respective devices on the network and the entire network may compose the computer.

Note that, although the present invention has been described as a hardware configuration in the above example embodiments, the present invention is not limited thereto. In the present invention, any function (process), in particular, the processes shown in FIGS. 2, 7 to 9, 11, and 14 may be implemented by causing a Central Processing Unit (CPU) to execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Processes performed by the apparatus and the method shown in the claims, the specification, and the figures can be performed in any order as long as the order of a process is not indicated by "prior to," "before," or the like and as long as the output from a previous process is not used in a later process. Even if the process flow in the claims, the specification, and the figures is described using phrases such as "first" or "next" for the sake of convenience, it does not necessarily mean that the processes have to be performed in this order.

Although the present disclosure has been described with reference to the example embodiments, the present disclosure is not limited to the above-described example embodiments. Various changes that may be understood by those skilled in the art may be made to the configurations and details of the present disclosure within the scope of the disclosure.

The whole or part of the exemplary embodiments disclosed above can be described as, but not limited to, the following supplementary notes.

(Supplementary Note 1)

An image processing system comprising:
- an image acquisition unit configured to acquire a monochrome image including a target part;
- a hint acquisition unit configured to acquire a category of the target part and a first color hint indicating a color of the target part;
- a hint conversion unit configured to convert the first color hint into a second color hint indicating the color of the target part based on the acquired category; and
- a colorization generation unit configured to generate a colorized image corresponding to the monochrome image from the monochrome image and the second color hint of the target part by using a prediction model trained by machine learning.

(Supplementary Note 2)

The image processing system according to Supplementary note 1, further comprising a first conversion table for associating the category with a plurality of the second color hints and storing them,
- wherein the hint conversion unit selects, by using the first conversion table, the second color hint in which a color difference between the second color hint and the first color hint is the smallest from among the plurality of the second color hints associated with the acquired category.

(Supplementary Note 3)

The image processing system according to Supplementary note 1, further comprising a second conversion table for associating the first color hint, the category, and the second color hint with each other and storing them,
- wherein the hint conversion unit acquires the second color hint associated with the acquired category and first color hint by using the second conversion table.

(Supplementary Note 4)

The image processing system according to Supplementary note 1, further comprising a third conversion table for storing a conversion parameter corresponding to the category,
- wherein the hint conversion unit converts the first color hint into the second color hint by using the conversion parameter corresponding to the acquired category, the conversion parameter being stored in the third conversion table.

(Supplementary Note 5)

The image processing system according to any one of Supplementary note 1 to 4, further comprising a hint adjustment unit configured to adjust color space coordinates of the converted second color hint based on a distance between the color space coordinates of the converted second color hint and color space coordinates of the first color hint,
wherein the colorization generation unit generates the colorized image corresponding to the monochrome image based on the adjusted second color hint.

(Supplementary Note 6)

The image processing system according to any one of Supplementary note 1 to 5, further comprising:
- a target detection unit configured to detect the target part from the monochrome image; and
- a detection display unit configured to display the detected target part,
- wherein the hint acquisition unit receives an input of the first color hint of the displayed target part from a user.

(Supplementary Note 7)

The image processing system according to Supplementary note 6, wherein the target detection unit estimates the category of the target part based on the detected target part.

(Supplementary Note 8)

An image processing method comprising:
- acquiring a monochrome image including a target part;
- acquiring a category of the target part and a first color hint indicating a color of the target part;
- converting the first color hint into a second color hint indicating the color of the target part based on the acquired category; and
- generating a colorized image corresponding to the monochrome image from the monochrome image and the second color hint of the target part by using a prediction model trained by machine learning.

(Supplementary Note 9)

A non-transitory computer readable medium storing an image processing program for causing a computer to implement:
- an image acquisition function of acquiring a monochrome image including a target part;
- a hint acquisition function of acquiring a category of the target part and a first color hint indicating a color of the target part;
- a hint conversion function of converting the first color hint into a second color hint indicating the color of the target part based on the acquired category; and
- a colorization generation function of generating a colorized image corresponding to the monochrome image from the monochrome image and the second color hint of the target part by using a prediction model trained by machine learning.

REFERENCE SIGNS LIST

1 MONOCHROME IMAGE DISPLAY UNIT
2 COLORIZED IMAGE DISPLAY UNIT
3 COLOR PALETTE
4 CATEGORY INPUT UNIT
5 COLOR SPACE DISPLAY UNIT
6 HINT DISPLAY UNIT
7 IMAGE INPUT UNIT
8 IMAGE OUTPUT UNIT
10, 20, 30, 40 APPARATUS
102 IMAGE ACQUISITION UNIT
105, 205 HINT ACQUISITION UNIT
106, 206 HINT CONVERSION UNIT
120, 220 COLORIZATION GENERATION UNIT
200, 300, 400 ACQUISITION UNIT
202 IMAGE ACQUISITION UNIT
204 HINT DETERMINATION UNIT
210 STORAGE UNIT
216 TRAINING DATABASE
240 OUTPUT UNIT

260 MODEL GENERATION UNIT
262 LEARNING PROCESSING UNIT
264 MODEL OPTIMIZATION UNIT
304, 404 HINT DETERMINATION UNIT
307 HINT ADJUSTMENT UNIT
406 TARGET DETECTION UNIT
408 DETECTION DISPLAY UNIT
M MONOCHROME IMAGE
C COLORIZED IMAGE
H COLOR HINT
P TARGET POSITION INFORMATION
F DETECTED SUBJECT

What is claimed is:

1. An image processing system comprising:
   at least one memory storing instructions, and
   at least one processor configured to execute the instructions to:
   acquire a monochrome image including a target part;
   acquire a category of the target part and a first color hint indicating a color of the target part;
   convert the first color hint into a second color hint indicating the color of the target part based on the acquired category;
   generate a colorized image corresponding to the monochrome image from the monochrome image and the second color hint of the target part by using a prediction model trained by machine learning;
   adjust color space coordinates of the converted second color hint based on a distance between the color space coordinates of the converted second color hint and color space coordinates of the first color hint; and
   generate the colorized image corresponding to the monochrome image based on the adjusted second color hint.

2. The image processing system according to claim 1, further comprising a first conversion table for associating the category with a plurality of the second color hints and storing them,
   wherein the at least one processor executes the instruction to, by using the first conversion table, the second color hint in which a color difference between the second color hint and the first color hint is the smallest from among the plurality of second color hints associated with the acquired category.

3. The image processing system according to claim 1, further comprising a second conversion table for associating the first color hint, the category, and the second color hint with each other and storing them,
   wherein the at least one processor executes the instructions to acquire the second color hint associated with the acquired category and first color hint by using the second conversion table.

4. The image processing system according to claim 1, further comprising a third conversion table for storing a conversion parameter corresponding to the category,
   wherein the at least one processor executes the instructions to convert the first color hint into the second color hint by using the conversion parameter corresponding to the acquired category, the conversion parameter being stored in the third conversion table.

5. The image processing system according to claim 1, wherein the at least one processor executes the instructions:
   to detect the target part from the monochrome image; and
   to display the detected target part; and
   to receive an input of the first color hint of the displayed target part from a user.

6. The image processing system according to claim 5, wherein the at least one processor executes the instructions to estimate the category of the target part based on the detected target part.

7. An image processing method comprising:
   acquiring a monochrome image including a target part;
   acquiring a category of the target part and a first color hint indicating a color of the target part;
   converting the first color hint into a second color hint indicating the color of the target part based on the acquired category;
   generating a colorized image corresponding to the monochrome image from the monochrome image and the second color hint of the target part by using a prediction model trained by machine learning;
   adjusting color space coordinates of the converted second color hint based on a distance between the color space coordinates of the converted second color hint and color space coordinates of the first color hint; and
   generating the colorized image corresponding to the monochrome image based on the adjusted second color hint.

8. A non-transitory computer readable medium storing an image processing program for causing a computer to:
   acquire a monochrome image including a target part;
   acquire a category of the target part and a first color hint indicating a color of the target part;
   convert the first color hint into a second color hint indicating the color of the target part based on the acquired category;
   generate a colorized image corresponding to the monochrome image from the monochrome image and the second color hint of the target part by using a prediction model trained by machine learning;
   adjust color space coordinates of the converted second color hint based on a distance between the color space coordinates of the converted second color hint and color space coordinates of the first color hint; and
   generate the colorized image corresponding to the monochrome image based on the adjusted second color hint.

* * * * *